(12) United States Patent
Piemonte et al.

(10) Patent No.: US 8,725,072 B2
(45) Date of Patent: *May 13, 2014

(54) METHOD AND APPARATUS FOR TRIGGERING NETWORK DEVICE DISCOVERY

(71) Applicant: Apple Inc., Cupertino, CA (US)

(72) Inventors: Patrick S. Piemonte, San Francisco, CA (US); Ronald K. Huang, Milpitas, CA (US); Parin Patel, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/649,485

(22) Filed: Oct. 11, 2012

(65) Prior Publication Data

US 2013/0035039 A1  Feb. 7, 2013

Related U.S. Application Data

(62) Division of application No. 12/603,083, filed on Oct. 21, 2009, now Pat. No. 8,290,434.

(51) Int. Cl.
*H04B 5/00* (2006.01)

(52) U.S. Cl.
USPC .......... 455/41.1; 455/41.2; 455/41.3; 702/92; 381/181

(58) Field of Classification Search
USPC ............... 455/41.1, 41.2–41.3; 702/74–95; 33/326; 73/1; 340/995.18, 357.14, 340/357.08, 539.13; 342/465, 357.08; 381/181
See application file for complete search history.

(56) References Cited

U.S. PATENT DOCUMENTS

| 3,081,787 | A | 3/1963 | Meulendyk |
| 6,286,221 | B1 | 9/2001 | Voto et al. |
| 6,760,678 | B1 | 7/2004 | Hon et al. |
| 7,403,744 | B2 | 7/2008 | Bridgelall |
| 7,433,677 | B2 | 10/2008 | Kantola |
| 7,890,262 | B2 | 2/2011 | Judd et al. |

(Continued)

FOREIGN PATENT DOCUMENTS

| CN | 1564256 A | 1/2005 |
| CN | 101099303 A | 1/2008 |

(Continued)

OTHER PUBLICATIONS

"AKM Introduces a Low Power Fully Integrated 3-Axis Electronic Compass IC", AKM Semiconductor, Inc., San Jose, CA, USA, Oct. 31, 2005, (1 page).

(Continued)

*Primary Examiner* — Nay A Maung
*Assistant Examiner* — Angelica M Perez
(74) *Attorney, Agent, or Firm* — Blakely, Sokoloff, Taylor & Zafman LLP

(57) ABSTRACT

A compass output in a first portable electronic device is monitored as the first device and a second electronic device come closer to each other. It is determined, by a process running in the first device, whether a magnetic field signature that is based on the monitored compass output is associated with a previously defined type of electronic device with which a network device discovery process is to be conducted. Other embodiments are also described and claimed.

11 Claims, 4 Drawing Sheets

(56) References Cited

U.S. PATENT DOCUMENTS

| | | | |
|---|---|---|---|
| 8,290,434 B2 * | 10/2012 | Piemonte et al. | 455/41.1 |
| 2002/0066194 A1 * | 6/2002 | Lu | 33/355 R |
| 2004/0227407 A1 | 11/2004 | Nagai | |
| 2006/0079180 A1 | 4/2006 | Sinivaara | |
| 2007/0005246 A1 | 1/2007 | Kappi | |
| 2007/0089311 A1 | 4/2007 | Amundson | |
| 2007/0141989 A1 | 6/2007 | Flinchem | |
| 2008/0067231 A1 * | 3/2008 | Song | 235/375 |
| 2009/0054077 A1 * | 2/2009 | Gauthier et al. | 455/456.1 |
| 2009/0085873 A1 | 4/2009 | Betts et al. | |
| 2009/0137204 A1 | 5/2009 | Chang | |
| 2009/0215397 A1 | 8/2009 | Thorn et al. | |
| 2011/0215921 A1 | 9/2011 | Ayed et al. | |

FOREIGN PATENT DOCUMENTS

| | | | |
|---|---|---|---|
| WO | WO-03081787 | * | 10/2003 |
| WO | WO-2005109781 | * | 11/2005 |
| WO | WO-2009074887 A1 | | 6/2009 |

OTHER PUBLICATIONS

Ghanname, Taoufik, "How NFC can to speed Bluetooth transactions— today", Phillips Semiconductors, Feb. 14, 2006, Internet article at: http://www.commsdesign.com/showArticle.jhtml?articleID=180203270, (5 pages).

Lewis, F. L., "Wireless Sensor Networks", Smart Environments: Technologies, Protocols, and Applications, ed. D. J. Cook and S. K. Das, John Wiley, New York, 2004, (18 apges).

Paus, Annika, "Near Field Communications in Cell Phones", Seminararbeit Ruhr-Universität Bochum, Jul. 24, 2007, (26 pages).

PCT International Search Report/Written Opinion (dated Feb. 2, 2011), International Application No. PCT/US2010/052032, International Filing Date—Oct. 8, 2010, (14 pages).

PCT International Preliminary Report on Patentability (dated May 3, 2012), International Application No. PCT/US2010/052032, International Filing Date—Oct. 8, 2010, [9 pages].

* cited by examiner

18

| MAGNETIC FIELD INTERFERENCE SIGNATURE | NETWORK DEVICE DISCOVERY |
|---|---|
| Spike($H_i$ > $^+$128μT) | Smart phone Bluetooth, WiFi |
| Spike($H_i$ < $^-$128μT) | Smart phone Bluetooth, WiFi |
| jump (from $|H|$ < 50 to $|H|$ > 70μT) | digital media player, Bluetooth |
| jump (Heading changes "quickly" relative to rotation of the portable device) | generic external device, Ethernet |

FIG. 3

METHOD AND APPARATUS FOR TRIGGERING NETWORK DEVICE DISCOVERY

This application is a divisional of co-pending U.S. application Ser. No. 12/603,083 filed on Oct. 21, 2009.

FIELD

An embodiment of the invention relates to techniques for triggering a process within a portable electronic device that identifies itself for purposes of establishing communications with another device that is in proximity. Other embodiments are also described.

BACKGROUND

A portable electronic device is in essence a mobile device that can be easily carried to various locations by its user where it is then able to connect with external devices and then perform data transfers with those external devices. For example, when a user of a smart phone arrives into their office and sits next to their office desktop computer, an automatic process may connect the smart phone with the desktop to allow data transfer between the two devices.

There are several wired and wireless communication protocols that can be used to make a connection between two devices. A wired network may be joined via an Ethernet port of the portable device. For a wireless connection, the portable device and the external device may both be interoperable using a wireless local area network (WLAN) protocol, such as the IEEE 802.11 Standard (also referred to as WiFi). This protocol allows peer-to-peer direct connections between the portable device and an external device such as a desktop personal computer (also referred to as a wireless ad-hoc network mode). In addition, the WiFi protocol also supports a connection to a router and/or an access point of a centralized wireless network. The connection between the portable device and the external device may alternatively be made using a Bluetooth protocol which may be used to create a personal area network in which several devices located within relatively short distances to each other are connected. Finally, exchange of data between the portable device and the external device may occur at an even shorter range (e.g., up to 20 cm) using a near field communication (NFC) protocol. NFC uses magnetic field induction, where one loop antenna in the portable device comes sufficiently close to another loop antenna in the external device, effectively forming an air-core transformer in which data is transferred between the two devices.

All of the above-described protocols for device-to-device communications require some type of identification process generically referred to here as network device discovery. This process is performed to set up a connection or a communication channel between the two devices. Certain characteristics of various network device discovery processes are worth noting. For instance, WiFi requires a configuration process that is more complex and lengthy than that required by Bluetooth, although WiFi is more suitable for operating larger scale networks and has a faster connection and greater distance range than Bluetooth. The set up process for Bluetooth is in turn more complicated and lengthy than that needed for NFC. When an NFC interface is available, it could be used to exchange Bluetooth pairing information to pair, for example, a headset and a smart phone, before handing off the data transfer to the Bluetooth protocol. In other words, the process of activating the Bluetooth interface on both sides, including searching, waiting, pairing and authorization between the two devices, may be replaced by a relatively fast setup over NFC followed by an exchange of Bluetooth pairing information over NFC.

SUMMARY

In accordance with an embodiment of the invention, a method for network device discovery monitors a compass output in a portable electronic device. As the portable device and an external device come closer to each other, a magnetic field signature is computed based on the monitored compass output. A determination is then made as to whether the computed signature can be associated with or implies that a previously defined type of electronic device (with which a network device discovery process can be conducted) is in close proximity. In other words, as the two devices come closer to each other, their respective magnetic characteristics cause the compass output to change in a way that implies that a network device discovery process should be initiated between the two devices. The detected change in the compass output can be compared to one or more previously stored, compass output patterns (magnetic field signatures). Each of these previous patterns may have been determined empirically or otherwise, to be the magnetic profile of a given type of external device that has come into proximity. A previous compass output pattern that best matches the newly detected compass output pattern is selected, and the device identification type or protocol information of the matching pattern is then used to perform a network device discovery process (using other signaling mechanisms). For example, if the detected compass output pattern matches that of a typical smart phone, then a WiFi or Bluetooth setup protocol is initiated in the portable device.

Using the compass output in this manner to in effect pre-screen another device, for purposes of establishing a communications connection whose setup is particularly involved or lengthy, may help make more efficient use of time and portable device resources. For instance, there is less power consumption and less network bandwidth consumption by the portable device, because the relatively complex WiFi or Bluetooth setup process may be kept suspended until needed. In addition, the relatively fast trigger provided by monitoring compass output (and comparing to previously stored patterns) can give an early start to a relatively lengthy set up protocol (such as that of Bluetooth) which includes both device search and service discovery processes. This helps avoid having to wait for a timer to expire before starting to poll or search for an external device.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

FIG. 3 shows an example data structure in the interference signature storage of the portable device.

DETAILED DESCRIPTION

Several embodiments of the invention with reference to the appended drawings are now explained. While numerous details are set forth, it is understood that some embodiments of the invention may be practiced without these details. In other instances, well-known circuits, structures, and techniques have not been shown in detail so as not to obscure the understanding of this description.

Figure 1:
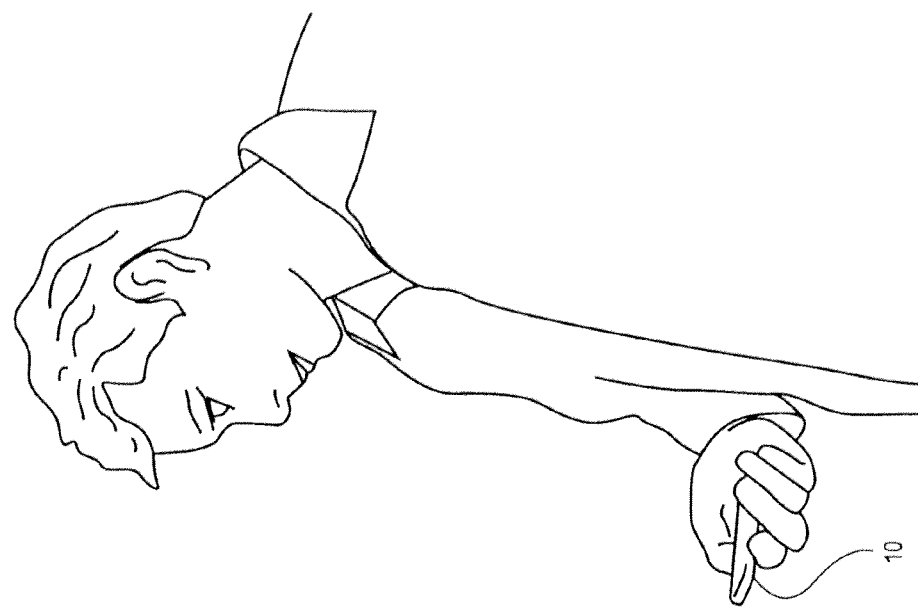
FIG. 1 shows two users holding their respective portable electronic devices in preparation for data transfer between them.
Figure 1:
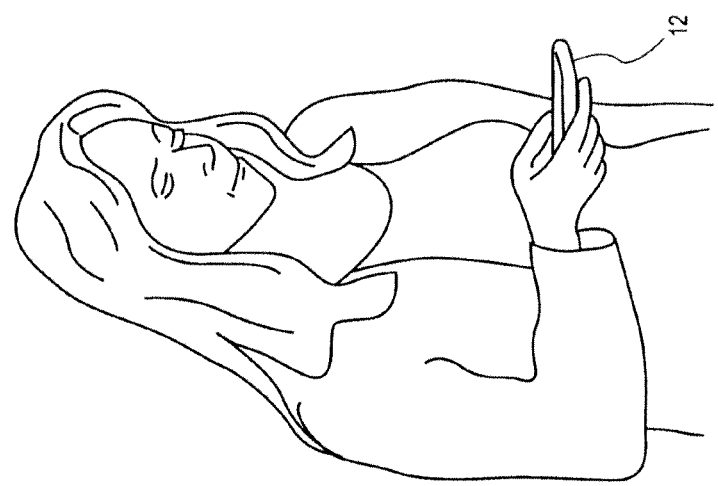

An embodiment of the invention is a method for network device discovery that may help improve the experience of users such as those depicted in FIG. 1. Those users are about to establish a connection between or otherwise identify their respective electronic devices 10, 12 to each other, to enable data transfer between them. Although FIG. 1 shows a pair of portable devices (namely, smart phones), as explained below, the method is also applicable to situations where a first portable device 10 is approaching a second electronic device 12 that may be a non-portable or fixed device such as a desktop personal computer, a router, or a wireless access point. The method takes advantage of the fact that the first portable device 10 contains an integrated circuit (IC) compass that provides its user with a geomagnetic field direction, be it for instance a heading or an arrow pointing to the Earth's north pole. The compass output is a calculated or measured, geomagnetic field vector (Earth's magnetic field), that has been corrected or calibrated for the disturbance or interference that results from local magnetic fields generated within and around the first device 10, e.g. by magnetic components such as a speaker and an inductor.

Empirical analysis, that is, relying on or derived from observation or experiment, reveals that when the first portable device 10 comes into close proximity with a second electronic device 12, the compass output in the first device 10 changes in such a way that can be measured. A magnetic field signature may thus be determined for that situation, based on the compass output changing (due to proximity of the two devices 10, 12). Once such a magnetic field signature is detected in the field, i.e. during use of the first device 10 in the normal course by its user, a network device discovery process is automatically triggered. The first device 10 thus initiates and performs the device discovery process with the second device 12, in accordance with another, conventional signaling mechanism or protocol that enables data transfer between a portable electronic device and an external device. For example, a Bluetooth protocol may be initiated by the first device 10, which starts to gather information about other Bluetooth devices that are sufficiently nearby. The resulting Bluetooth or personal area network configuration that is created may be a peer-to-peer network involving the first and second devices 10, 12, or it may be a point-to-multipoint configuration involving the device 10 and two or more other external devices, e.g. a router or an access point (not shown). The device discovery phases may include identification of a physical interface address, handshake or negotiation of transfer speed, authentication, and identification of different types of services supported.

Following completion of the device discovery process, the device 10 is now networked, and can perform data exchange with one or more external devices that have been networked or paired with it. The term "networked" is used here generically to refer to a range of different types of connected communication channels or links over which the devices 10, 12 can transfer data between each other, including point-to-point pairings as well as point-to-multi-point links and centralized networks.

Figure 2:
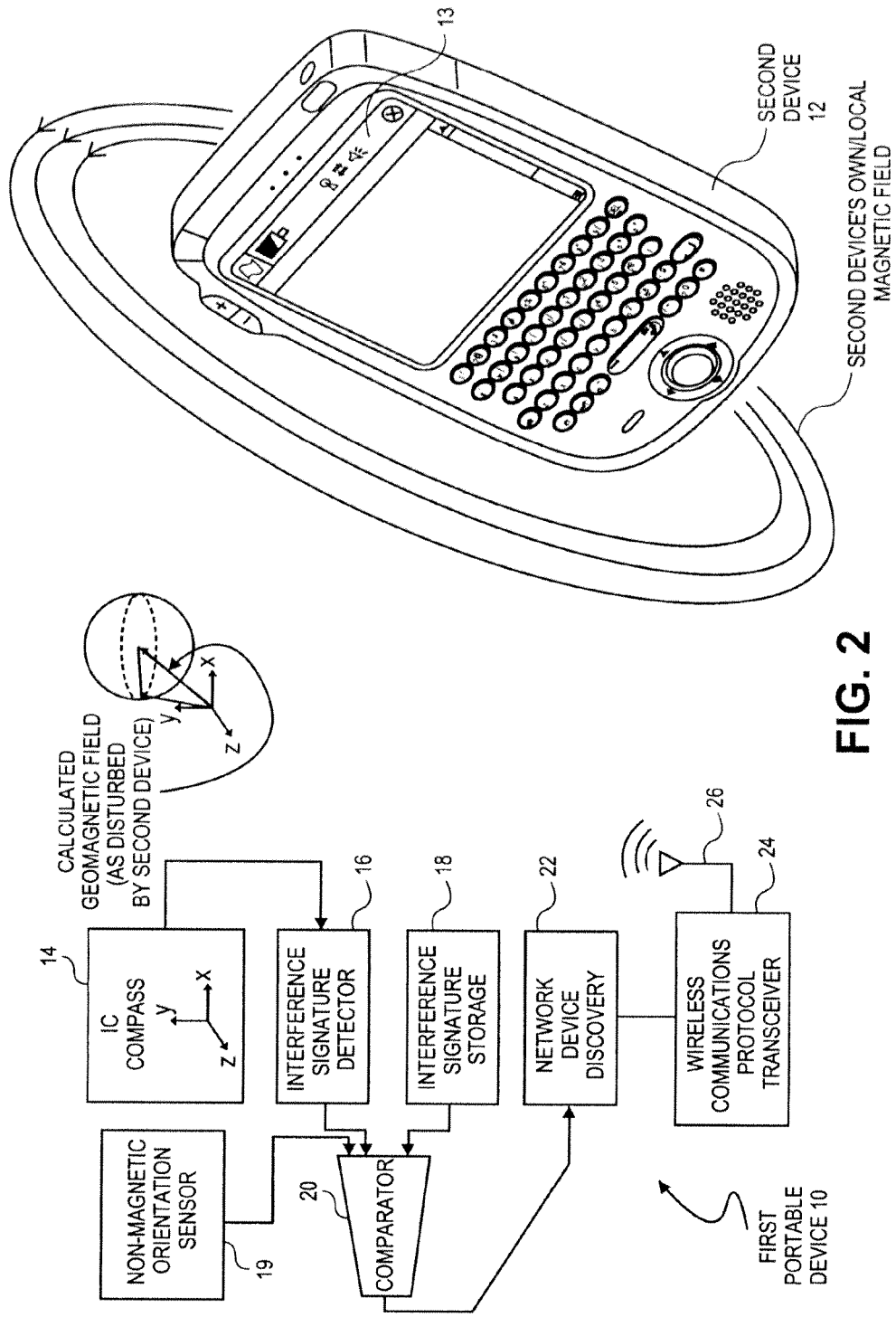
FIG. 2 is a block diagram of functional components of a portable device relevant to a network device discovery process.

Turning now to FIG. 2, a block diagram of some functional components of the first portable device 10 relevant to triggering a network device discovery process are shown. FIG. 2 also shows how the first device 10 is in proximity of the second device 12 and the latter's own or local magnetic field. In this example, the second device 12 is a smart phone whose display 13 is showing an antenna icon, which signifies that data transfer is occurring with another networked or paired device.

Integrated in the housing of the first portable device 10 are an IC compass 14 whose output is a calculated geomagnetic field that is provided to an interference signature detector 16. As suggested above, the IC compass 14 may be any conventional 3-axis magnetometer-based compass IC, such as those typically used in smart phones and portable navigation devices. An example of such an IC compass is the AK8970N fully integrated 3-axis electronic compass IC by AKM Semiconductor of San Jose, Calif.

As depicted in FIG. 2, the calculated geomagnetic field (a so referred to as the calibrated Earth field) has been disturbed by proximity with the local magnetic field of the second device 12. The disturbance is indicated by a vector that points to the center of a geomagnetic measurement sphere, which is now offset from the center of the coordinate system of the IC compass 14 as shown (due to the disturbance). The geomagnetic sphere is the locus of all points that can be generated at the compass output when rotating the portable device 10 about all three x, y, and z axes of the compass coordinate system. The sphere is offset from the center of the coordinate system of the compass 14, because of the disturbance introduced by the second device 12. The compass 14 has a calibration process that may eventually recognize or otherwise correct for the disturbance, by recalculating the geomagnetic field (thereby returning the center of its measurement sphere back to the center of the coordinate system).

In accordance with an embodiment of the invention, the compass output is monitored for disturbances or changes in the geomagnetic field, as the first device 10 and the second device 12 come closer to each other. This monitoring is performed by the interference signature detector 16. The latter may be a programmed processor with firmware or software that simply tracks or stores samples of the compass output, e.g. periodically, for example, every second. One or more of these samples are then made available to a comparator 20, as the detected magnetic field signature. As an alternative, the interference signature detector 16 may perform more complex processing of the raw compass output samples to calculate the magnetic field signature. Different ways of calculating or determining the magnetic field signature are possible. For example, the signature may be a set of one or more observed changes in the compass output over a given time sequence or interval. The observed changes may be in the calculated geomagnetic field strength and/or direction. The magnetic field interference signature detector 16 could, for example, compute the geomagnetic field vector strength, and would store such strength values in the form of a data structure representing a time sequence. The strength may refer to the value of any one of the three components (e.g., x, y, and z) of the geomagnetic field vector, or it may be the magnitude of the overall geomagnetic field vector, i.e. square_root ($H_x^2 + H_y^2 + H_z^2$) where $H_x$, $H_y$, $H_z$ are the components of the geomagnetic field vector calculated or measured by the compass 14.

It should be noted that in the examples given here, the detected changes in the geomagnetic field or the compass output are sudden in that they are captured by the signature detector 18 before the calibration process of the compass 14 has corrected them.

The first portable device 10 is also equipped with an interference signature storage 18 that contains one or more previously determined magnetic field signatures. The storage 18 may include a non-volatile solid state memory with a given data structure stored therein. The data structure may have one or more magnetic field signatures or compass output patterns that may have been empirically determined in advance, as representing situations where a particular external electronic device has come sufficiently close to the first portable device 10. FIG. 3 shows an example data structure in the interference signature storage 18. A signature or magnetic profile that is stored in the storage 18 can be accessed by the comparator 20, to determine whether a detected signature (that is based on the monitored compass output) can be associated with a previously defined type of electronic device with which a network device discovery process can be conducted.

The comparator 20 (which may be a programmed processor) compares the detected change in compass output to one or more previously stored, compass output patterns. For instance, a spike may be detected in the geomagnetic field vector strength, as an overflow in the compass output. The storage 18 (FIG. 3) refers to a spike in the geomagnetic field vector strength as being associated with or indicating that another smart phone is in proximity. In another instance, the detected magnetic field vector may have jumped, but did not result in an overflow condition; rather, a relatively sudden but limited direction change of the vector, or a sudden strength change, is detected. As an example, when the absolute value of the detected magnitude of the vector jumps from less than 50 microtesla to greater than 70 microtesla, then this magnetic field signature can be interpreted as being associated with another type of the second electronic device 12 (e.g., a dedicated digital media player).

In another embodiment, the comparator 20 has a further input, namely information about the orientation of the device 10 as sensed or measured by a non-magnetic orientation sensor 19, e.g. MEMS-based accelerometer or a gyroscope integrated in the housing of the device 10. The comparator 20 could compare heading changes (from monitoring the compass output) to rotation of the device 10 as indicated by the non-magnetic orientation sensor 19. When such a change is relatively quick, e.g. as defined by a given signature in the interference storage 18 (see FIG. 3), then this may indicate that network device discovery should be initiated as a "generic" external device is expected to be in proximity.

Still referring to FIG. 2, once the comparator 20 has found a matching signature and then signaled that a network device discovery process should be initiated or performed, a network device discovery module 22 responds by initiating a conventional network device discovery process. The module 22, similar to the detector 16 and the comparator 20, may be a processor in the portable device 10 that has been configured or programmed in accordance with software or firmware. The module 22 conducts the device discovery process by signaling through an appropriate physical layer interface. In this example, the latter includes a wireless communications protocol transceiver 24 that is coupled to an antenna 26, representing the physical layer (or phy) of a wireless communications protocol that can be used to perform wireless data transfer with the second device 12. It should be noted that as an alternative, the network device discovery module 22 could select a different communications protocol phy interface in the first device 10. Thus, for example, there may be decision logic or decision making processes running in the network device discovery module 22 that select, for example, a WiFi protocol for discovering another WiFi device, rather than, for example, a Bluetooth protocol.

Figure 4:
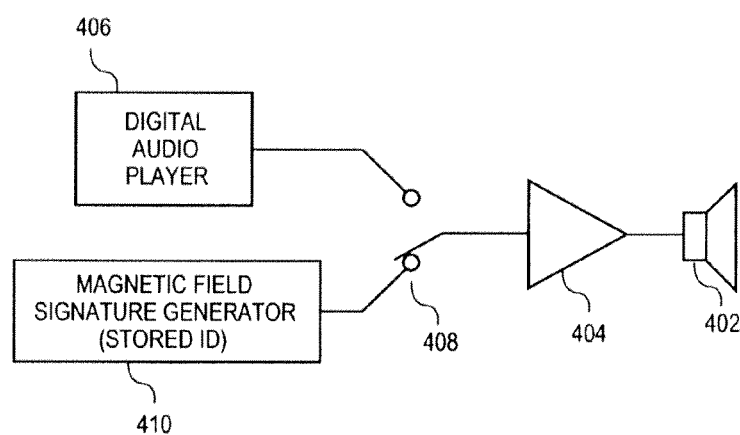
FIG. 4 is a block diagram of an electronic device having a magnetic field signature generator.

The above description refers to a technique where a magnetic field signature of an external device is detected using the compass of a portable device, for purposes of triggering a network device discovery process. FIG. 4 illustrates a technique for creating a particular magnetic field signature in the external device. The external device may be any of a wide range of electronic devices that include a speaker 402, which is driven by an audio power amplifier 404. Examples include desktop personal computers and smart phones. Also typical of conventional electronic devices is a digital audio player 406 that is able to read digital audio files (e.g., music files; movie files) and decode or play them back through the power amplifier 404 and speaker 402. The output of the digital audio player 406 is fed to the input of the power amplifier 404 through a switch, mixer, or multiplexer (generically referred to here as a switch 408). The switch 408 has another input that is coupled to the output of a magnetic field signature generator 410. The latter is to drive the speaker 402 in accordance with a magnetic field signature that is encoded with an identification value of the electronic device. The magnetic field signature generator 410 may produce an encoded supersonic tone signal which may be mixed with or combined with audio from the digital audio player 406 by the switch 408. This combination is then driven by the power amplifier 404 through the speaker 402. This is designed to produce a change in the local magnetic interference field of the portable device 10 that can be detected by the IC compass 14 of the portable device (see FIG. 2). The generated tone signal may be supersonic so as to not be obtrusive to human ears while still being able to produce the desired change in the local magnetic field that can be detected by the compass of the portable device. This technique allows each electronic device to be encoded with a unique, magnetic field signature that can be detected by the compass of a portable device that is in sufficient proximity, for purposes of triggering a subsequent network device discovery process.

To conclude, various aspects of a technique for triggering network device discovery L o a portable electronic device have been described. As explained above, an embodiment of the invention may be a machine-readable medium such as one or more solid state memory devices having stored thereon instructions which program one or more data processing components (generically referred to here as "a processor") to perform some of the operations described above. In other embodiments, some of these operations might be performed by specific hardware components that contain hardwired logic. Those operations might alternatively be performed by any combination of programmed data processing components and fixed hardware circuit components.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, although the described instances of the network device discovery process that is triggered by the matching magnetic field signature all use a wireless protocol, a network device discovery process that uses a wired protocol, such as Ethernet, could also be triggered. The description is thus to be regarded as illustrative instead of limiting.

What is claimed is:

1. An electronic device comprising:
   a speaker;
   a digital audio player to drive the speaker; and
   a magnetic field signature generator to drive the speaker in accordance with a magnetic field signature signal that is encoded with an identification value of the electronic device so that the speaker can produce a change in a local magnetic field of the electronic device in order to produce a magnetic field signature that is detectable by an electronic compass in a nearby portable electronic device and that identifies the electronic device for purposes of network device discovery.

2. The electronic device of claim 1, further comprising:
   an amplifier having an output coupled to the speaker; and
   a switch having a first input coupled to the digital audio player and a second input coupled to the magnetic field signature generator and an output coupled to an input of the amplifier.

3. The electronic device of claim 2, wherein the switch is a multiplexor.

4. The electronic device of claim 2, wherein the switch is to combine a first signal from the digital audio player and a second signal from the magnetic field signature generator and the amplifier is to drive the combined signal through the speaker and further wherein the first signal is an audio signal and the second signal is a supersonic tone signal.

5. The electronic device of claim 4, wherein the combined signal is to change the local magnetic interference field to produce the magnetic field signature that is to be detected by the electronic compass in the portable electronic device.

6. The electronic device of claim 1, wherein the electronic device is a desktop personal computer.

7. The electronic device of claim 1, wherein the electronic device is a smart phone.

8. A method for creating a magnetic field signature in an electronic device, comprising:
   receiving a magnetic field signature signal that is encoded with an identification value of the electronic device;
   driving a speaker in accordance with the magnetic field signature signal, thereby changing a local magnetic field that is detected by an electronic compass in a portable electronic device when the electronic device is sufficiently proximate to the portable electronic device; and
   performing a network device discovery process with the portable electronic device, in response to the portable electronic device having detected the local magnetic field as identifying said electronic device.

9. The method of claim 8, wherein driving the speaker in accordance with the magnetic field signature signal comprises:
   generating a supersonic tone signal encoded with the identification value of the electronic device; and
   driving the speaker in accordance with the supersonic tone signal.

10. The method of claim 9, further comprising:
    mixing the supersonic tone signal with a signal produced by a digital audio player of the electronic device to produce a combined signal; and
    driving the speaker in accordance with the combined signal.

11. The method of claim 8, wherein the identification value indicates a type of the electronic device being one of a smartphone, a digital media player, or a generic external device.

* * * * *